United States Patent
Ueta et al.

(10) Patent No.: US 8,760,832 B2
(45) Date of Patent: Jun. 24, 2014

(54) LOAD CIRCUIT PROTECTION DEVICE

(75) Inventors: Keisuke Ueta, Susono (JP); Akinori Maruyama, Susono (JP); Yoshihide Nakamura, Susono (JP)

(73) Assignee: Yazaki Corporation, Tokyo (JP)

( * ) Notice: Subject to any disclaimer, the term of this patent is extended or adjusted under 35 U.S.C. 154(b) by 426 days.

(21) Appl. No.: 13/139,356

(22) PCT Filed: Dec. 24, 2009

(86) PCT No.: PCT/JP2009/071490
§ 371 (c)(1), (2), (4) Date: Jun. 13, 2011

(87) PCT Pub. No.: WO2010/074175
PCT Pub. Date: Jul. 1, 2010

(65) Prior Publication Data
US 2011/0242716 A1 Oct. 6, 2011

(30) Foreign Application Priority Data
Dec. 26, 2008 (JP) .................................. 2008-334807

(51) Int. Cl.
H02H 3/00 (2006.01)

(52) U.S. Cl.
USPC .......................................................... 361/79

(58) Field of Classification Search
USPC .......................................................... 361/79
See application file for complete search history.

(56) References Cited

U.S. PATENT DOCUMENTS

| | | | |
|---|---|---|---|
| 6,061,259 A * | 5/2000 | DeMichele | 363/125 |
| 6,094,092 A | 7/2000 | Mizuno et al. | |
| 7,111,180 B2 * | 9/2006 | Vyssotski et al. | 713/300 |
| 2007/0103832 A1 | 5/2007 | Ohshima | |

FOREIGN PATENT DOCUMENTS

JP 1-301432 A 12/1989
(Continued)

OTHER PUBLICATIONS

International Search Report for PCT/JP2009/071490 dated Mar. 9, 2010 [PCT/ISA/210].

(Continued)

*Primary Examiner* — Stephen W Jackson
(74) *Attorney, Agent, or Firm* — Sughrue Mion, PLLC

(57) ABSTRACT

To provide a protection circuit for a load circuit which can distinguish between an overcurrent generated at a load and a rush current generated at the time of turning on a semiconductor switch or switches provided on the downstream side of the semiconductor switch and can turn the semiconductor switch off only when the overcurrent is generated to thereby protect the load circuit. A comparator CMP1 compares a detection current I1 detected by an ampere meter 15 with a threshold current Iref set in advance. When the detection current I1 reaches the threshold current Iref, the semiconductor switch 11 is turned off to thereby protect the load circuit. Further, a voltage Vd on an electric wire coupling between a battery VB and the semiconductor switch 11 is measured. When a counter electromotive force is generated and the voltage Vd reduces, the threshold current Iref is reduced according to the voltage reduction. Thus, at the time of the occurrence of a dead short, the detection current I1 immediately reaches the threshold current Iref to thereby turn the semiconductor switch 11 off. At the time of the generation of a rush current, since the detection current I1 does not reach the threshold current Iref, the generation of the erroneous turning-off can be prevented.

4 Claims, 4 Drawing Sheets

(56) References Cited

FOREIGN PATENT DOCUMENTS

| JP | 6121589 A | 4/1994 |
|---|---|---|
| JP | 11-51983 A | 2/1999 |
| JP | 11-108969 A | 4/1999 |
| JP | 200432903 A | 1/2004 |
| JP | 2007-134780 A | 5/2007 |

OTHER PUBLICATIONS

Office Action dated Jul. 3, 2013, issued by the State Intellectual Property Office of the People's Republic of China, in counterpart application No. 200980152175.1.

Office Action, dated for Oct. 1, 2013, issued by the Japanese Patent Office in counterpart Japanese Application No. 2008-334807.

* cited by examiner

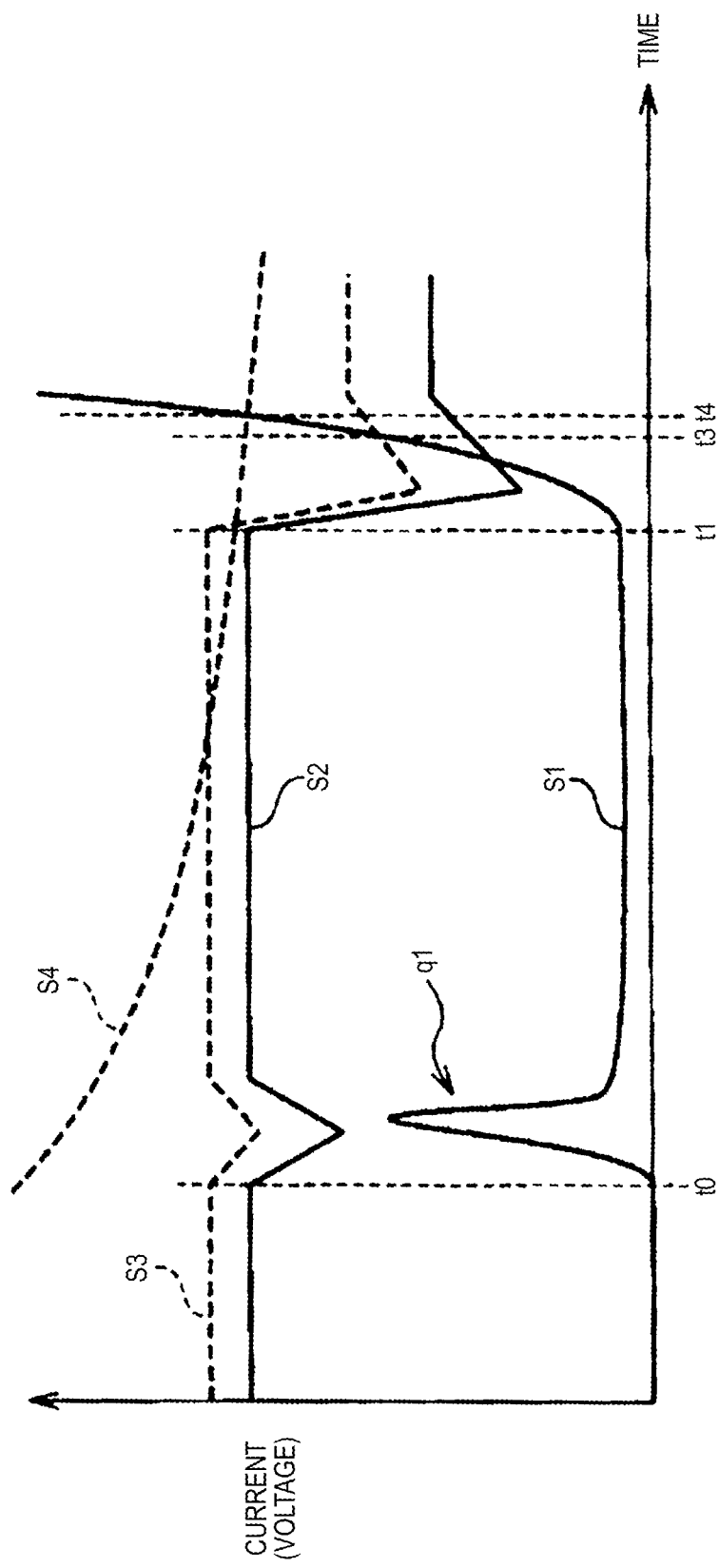

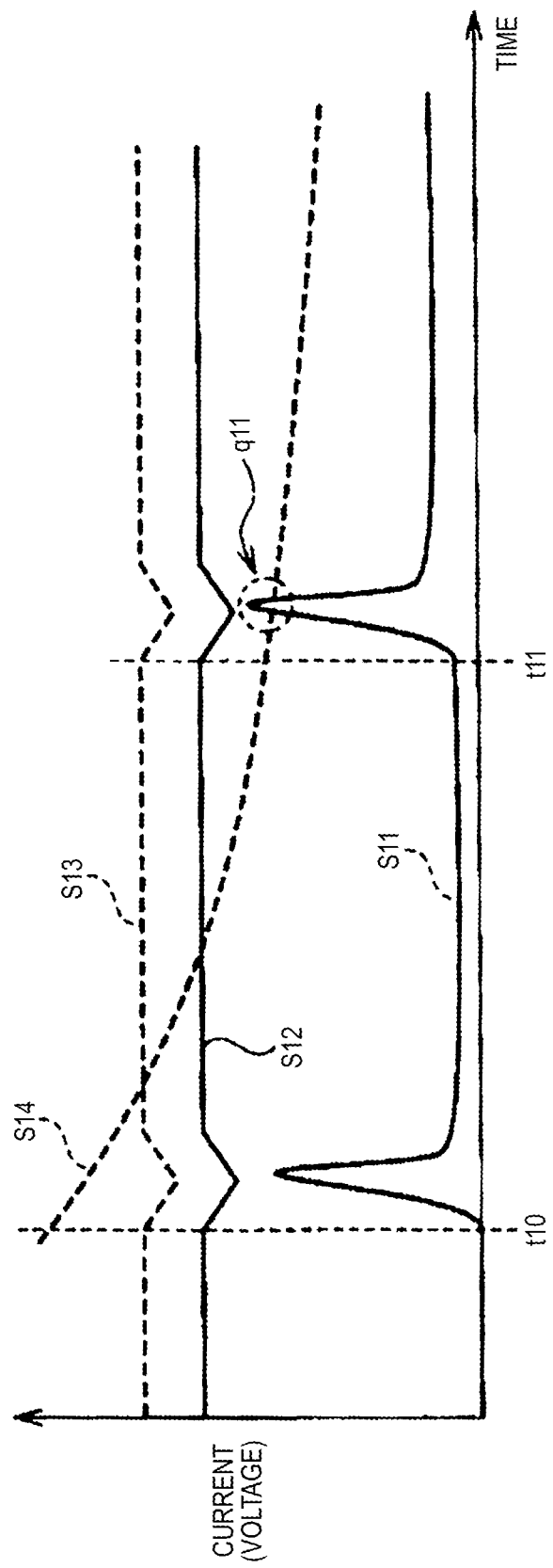

LOAD CIRCUIT PROTECTION DEVICE

TECHNICAL FIELD

The present invention relates to a load circuit protection device which protects from an overcurrent the load circuit for controlling the driving and the stop of a load by using a semiconductor switch provided between a DC power supply and the load.

BACKGROUND ART

For example, the driving and the stop of a load such as a power window driving motor or a lamp to be mounted on a vehicle is controlled by adjusting a DC voltage supplied from a battery through the turning-on and off operation of a semiconductor switch such as a MOSFET.

In such the load circuit, in order to protect the load circuit at the time of the occurrence of an overcurrent, a threshold current is set in advance and a protection device which turns off the semiconductor switch when a load current exceeds the threshold current is provided. Further, when a rush current generated immediately after the turning-on of the semiconductor switch reaches the threshold current, the semiconductor switch may be erroneously turned off. Thus, as disclosed in JP-A-11-51983 (Patent Literature 1), for example, it has been proposed to prevent the erroneous turning-off of the semiconductor switch by setting the threshold current to a high current value immediately after the semiconductor switch is turned on.

According to the Patent Literature 1, a shunt resistor is provided in a load circuit, then a voltage generated at the shunt resistor is compared with a threshold voltage (a voltage corresponding to the threshold current) set in advance, and it is determined that the current is the overcurrent when the voltage generated at the shunt resistor is greater than the threshold voltage to thereby turn off the semiconductor switch. Further, the Patent Literature 1 discloses that charge accumulated in a capacitor is added to the threshold voltage immediately after turning on the semiconductor switch to set the threshold voltage to be greater than the usual value to thereby prevent the erroneous turning-off of the semiconductor switch due to the rush current. That is, even when the rush current is generated to increase the voltage generated at the shunt resistor, since the threshold voltage is set to be high immediately after the semiconductor switch is turned on, the voltage generated at the shunt resistor can be prevented from exceeding the threshold voltage, whereby the erroneous turning-off of the semiconductor switch can be prevented.

According to the technique described in the Patent Literature 1, although the erroneous turning-off of the semiconductor switch due to the rush current generated immediately after semiconductor switch is turned on can be prevented. However, there is a problem that the semiconductor switch can not be turned off immediately, when a dead short occurs immediately after the turning-on of the semiconductor switch and the overcurrent flows. That is, since the threshold voltage (threshold current) is set to be higher than the usual threshold value immediately after the semiconductor switch is turned on, it takes a long time to determine the overcurrent. Thus, there arises a problem that circuit components such as electric wires and the semiconductor switch are overheated during the time until the determination of the overcurrent.

Further, since there is a case that a plurality of loads are provided on the downstream side of the semiconductor switch, and the plurality of loads are respectively provided with switches separately. In such the case, even in a case where the semiconductor switch is turned on and the current becomes stable upon the lapse of a certain time, a rush current flows again when the switch provided on the downstream side is turned on. Thus, there arises a problem that the semiconductor switch is erroneously turned off when the rush current exceeds the threshold current.

CITATION LIST

Patent Literature

Patent Literature 1 JP-A-11-51983

SUMMARY OF INVENTION

Technical Problem

As described above, the example of the prior art that is disclosed in the Patent Literature 1 is arranged to prevent the erroneous turning-off of the semiconductor switch due to the rush current by setting the threshold current to be high immediately after the semiconductor switch is turned on. Thus, there is the problem that it takes a long time to determine the overcurrent when an overcurrent due to the dead short etc. is generated immediately after the semiconductor switch is turned on.

Further, when the plurality of loads are provided on the downstream side of the semiconductor switch and the plurality of loads are respectively provided with the switches separately, the rush current flows into the semiconductor switch when the switch is turned on. Thus, there arises the problem that the semiconductor switch is erroneously turned off by the rush current.

This invention is made in order to solve such the problems of the prior art and an object of the invention is to provide a protection device for a load circuit which can distinguish between an overcurrent generated at a load and a rush current generated at the time of turning on a semiconductor switch or switches for driving loads provided on the downstream side of the semiconductor switch and can turn off the semiconductor switch immediately only when the overcurrent is generated to thereby protect the load circuit.

Solution to Problem

In order to attain the aforesaid object, according to the present invention, there is provided a load circuit protection device for protecting a load circuit including a DC power supply, a semiconductor switch and a load, comprising:

a current detection section that detects a current flowing into the semiconductor switch;

a voltage detection section that detects a voltage generated at an electric wire coupling between the DC power supply and the semiconductor switch;

a threshold current adjusting section that adjusts a threshold current for determining whether or not an overcurrent flows into the load circuit according to the voltage detected by the voltage detection section;

a turning-off control section that determines whether or not a current detected by the current detection section reaches the threshold current and outputs a turning-off signal when it is determined that the detected current reaches the threshold current; and a driving control section that switches an on/off state of the semiconductor switch based on an external input signal and turns off the semiconductor switch when the turning-off signal is supplied thereto.

Preferably, the threshold current adjusting section reduces the threshold current according to reduction of a voltage detected by the voltage detection section when the voltage detected by the voltage detection section is reduced.

Preferably, the threshold current adjusting section sets an upper limit voltage and a lower limit voltage as to a voltage detected by the voltage detection section, and the threshold current adjusting section adjusts the threshold current in a linear function manner in a voltage region between the lower limit voltage and the upper limit voltage and maintains the threshold current to a constant value in a voltage region equal to or lower than the lower limit voltage and in a voltage region equal to or greater than the upper limit voltage.

Advantageous Effects of Invention

In the load circuit protection device according to the invention, the current detection means detects a current flowing into the semiconductor switch, and the semiconductor switch is turned off to thereby protect the load circuit from the overheating in the case where the detection current reaches the threshold current set in advance. Further, the voltage on the electric wire coupling between the DC power supply and the semiconductor switch is detected and the threshold current is adjusted according to the voltage. For example, the threshold current is reduced when the detected voltage reduces. Thus, in the case where a dead short occurs in the load circuit, the detection current increases abruptly and a counter electromotive force is generated at the electric wire coupling between the DC power supply and the semiconductor switch, whereby the threshold current reduces. Accordingly, the detection current reaches the threshold current at an earlier time point and hence the semiconductor switch can be turned off.

Further, in the case where a rush current is generated due to the turning-on of the semiconductor switch or the turning-on of the switch provided on the downstream side of the semiconductor switch, although the threshold current reduces, the detection current does not reach the threshold current since an amount of the current reduction is small. Thus, the erroneous turning-off of the semiconductor switch caused by a rush current due to the occasional turning-on/off operation of the switch can be prevented.

BRIEF DESCRIPTION OF DRAWINGS

FIG. 4 is a characteristic diagram showing detection currents and the threshold currents in the load circuit protection device according to the embodiment of the invention.

FIG. 5 is a characteristic diagram showing the detection currents and the threshold currents in the load circuit protection device according to the embodiment of the invention.

DESCRIPTION OF EMBODIMENTS

Figure 1:
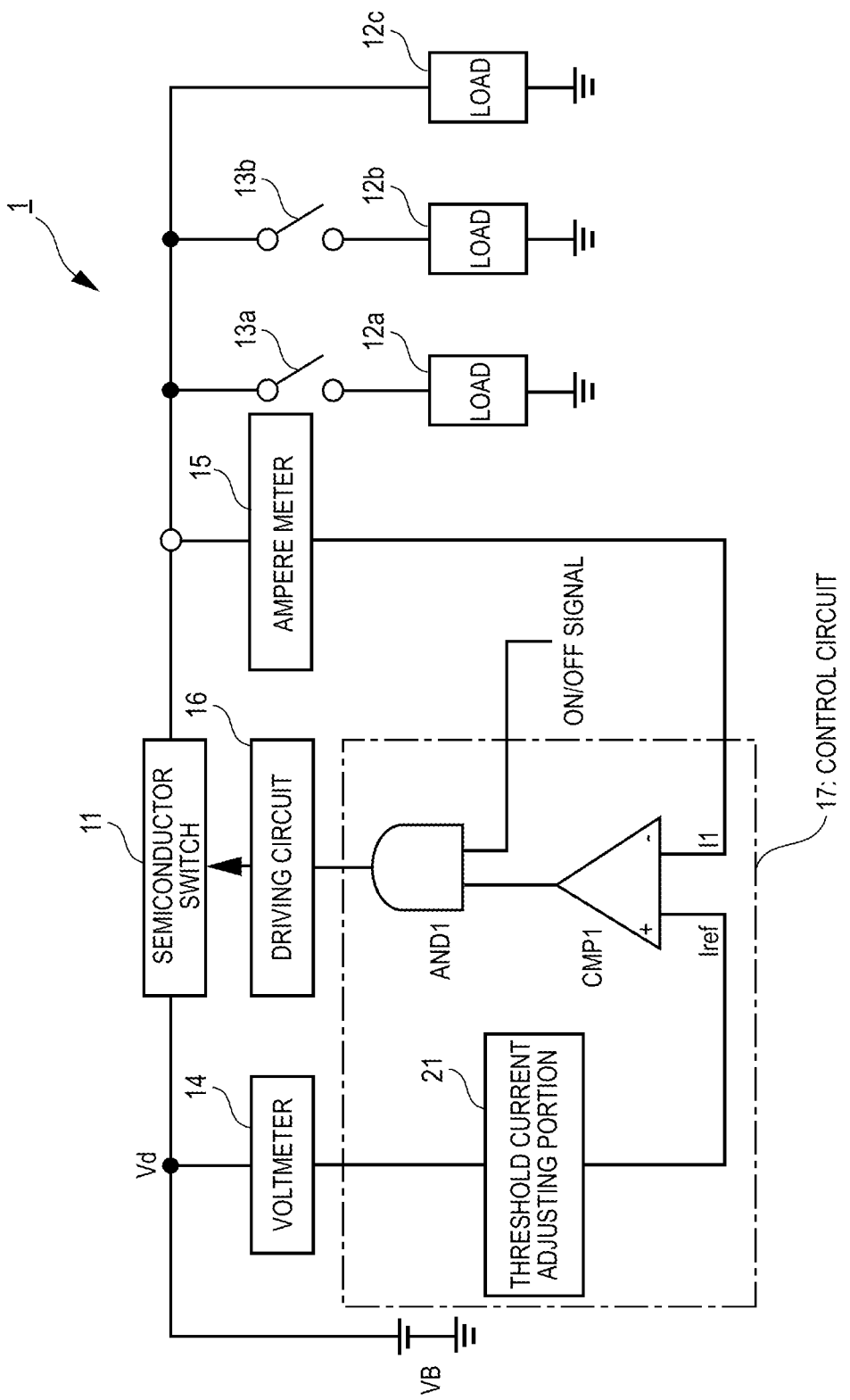
FIG. 1 is a block diagram showing the configuration of a load circuit having a load circuit protection device according to the embodiment of the invention.

Hereinafter, an embodiment of the invention will be explained based on drawings. FIG. 1 is a circuit diagram showing the configuration of a load circuit having the load circuit protection device according to the embodiment of the invention. As shown in FIG. 1, the load circuit 1 is a circuit for controlling the driving of loads 12a to 12c such as lamps, motors mounted on a vehicle, for example. In the load circuit 1, a semiconductor switch 11 such as a MOSFET is provided between a battery (DC power supply) VB mounted on the vehicle and the respective loads 12a to 12c, whereby the driving and stop of each of the loads 12a to 12c is controlled by controlling the on/off operation of the semiconductor switch 11. Further, since switches 13a, 13b are provided on the upstream sides of the loads 12a, 12b respectively, the driving and stop of each of the loads 12a and 12b can be operated separately.

A voltmeter 14 (voltage detection portion) for detecting the voltage at a point on an electric wire is provided on this electric wire coupling between the battery VB and the semiconductor switch 11. Further, an ampere meter 15 (current detection portion) for detecting the current flowing through the semiconductor switch 11 is provided on an electric wire coupling between the semiconductor switch 11 and the respective loads 12a to 12c. Both a voltage signal detected by the voltmeter 14 and a current signal detected by the ampere meter 15 are output to a control circuit 17.

The control circuit 17 includes a threshold current adjusting portion 21 which decides a threshold current (hereinafter referred to Iref) for determining whether or not an overcurrent is generated based on the voltage signal output from the voltmeter 14, a comparator CMP1 (shutoff control portion) for comparing the threshold current Iref decided by the threshold current adjusting portion 21 with a detection current (hereinafter referred to I1) detected by the ampere meter 15, and a logical circuit AND1 to which an external signal for switching the on/off state of the semiconductor switch 11 is input.

The ampere meter 15 detects the current flowing through the semiconductor switch 11 by using a current sensor or a shunt resistor. Further, in the case where a semiconductor switch having a current sensing function is employed, the current signal may be directly extracted from the semiconductor switch.

The output signal of the logical circuit AND1 is output to a driving circuit (driving control portion) 16 for controlling the on/off operation of the semiconductor switch 11.

The comparator CMP1 is supplied with the threshold current Iref at the positive-side input terminal thereof and also supplied with the detection current I1 at the negative-side input terminal thereof. When the detection current I1 exceeds the threshold current Iref, the output signal of the comparator CMP1 is changed into a Low level from a High level.

Figure 2:
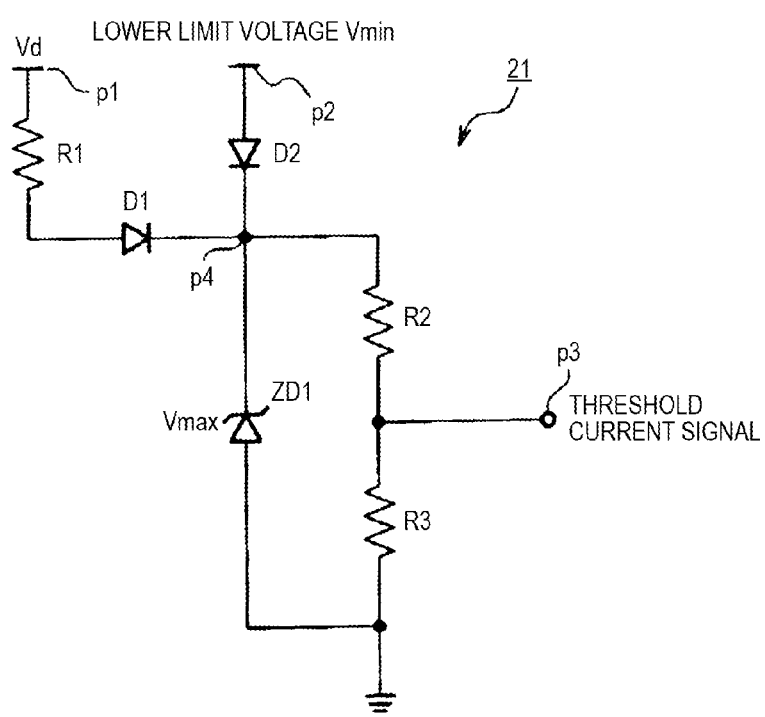
FIG. 2 is a circuit diagram showing the configuration of a threshold current adjusting portion in the load circuit protection device according to the embodiment of the invention.

The threshold current adjusting portion 21 adjusts the threshold current Iref based on the voltage (this voltage is referred to Vd) detected by the voltmeter 14. FIG. 2 is a circuit diagram showing the configuration of the threshold current adjusting portion 21. As shown in FIG. 2, the threshold current adjusting portion 21 includes a series connection circuit having a resistor R1, a diode D1 and resistors R2, R3, wherein a voltage Vd is supplied to a point p1 which is one end of the resistor R1 and one end of the resistor R3 is grounded. A point p4 which is a coupling point between the diode D1 and the resistor R2 is coupled to a point p2 to which a lower limit voltage Vmin is output via a diode D2. Further, the point p4 is grounded via a zener diode ZD1. Furthermore, a coupling point between the resistors R2 and R3 is formed as an output point p3 for the threshold current signal.

Figure 3:
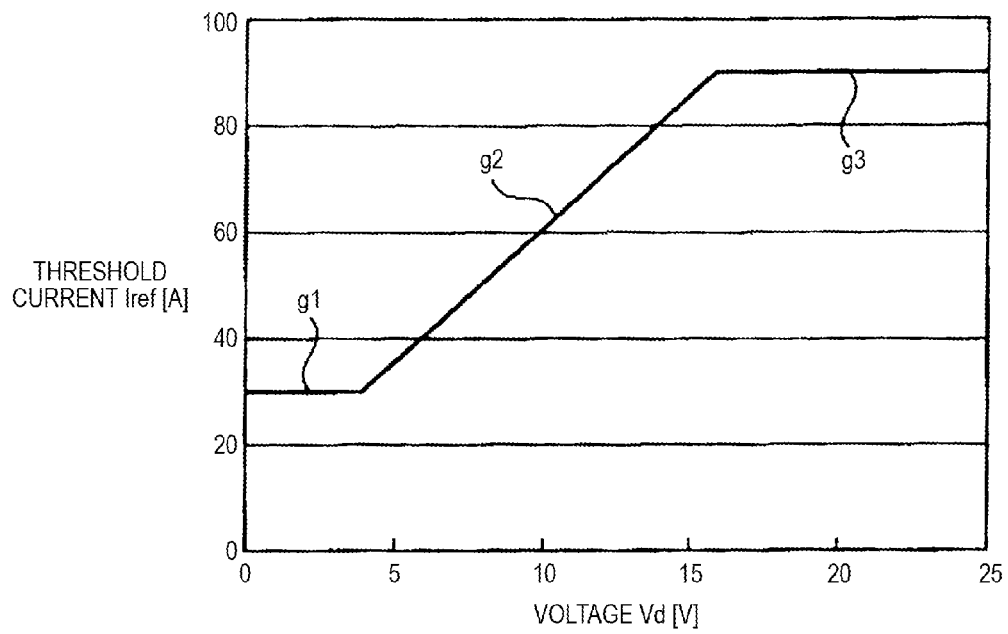
FIG. 3 is a characteristic diagram showing a relation between a voltage and a threshold current set in the threshold current adjusting portion in the load circuit protection device according to the embodiment of the invention.

According to the aforesaid configuration, when the voltage Vd is supplied to the point p1 and the lower limit voltage Vmin (for example, 5 [V]) for determining the lower limit voltage is supplied to the point p2 shown in FIG. 2, a voltage is generated at the point p3 as the threshold current signal. This threshold current signal is output to the comparator CMP1 shown in FIG. 1. This operation will be explained in detail with reference to a characteristic diagram shown in FIG. 3.

In the case where the voltage Vd is equal to or lower than the lower limit voltage Vmin, since the voltage at the point p4 is controlled by the lower limit voltage Vmin, the voltage at the point p4 becomes the constant value Vmin. As a result, the voltage at the point p3 becomes a constant value of 4 [V], for example. Since the voltage 4 [V] is made correspond to the threshold current 30 [A], the minimum threshold current becomes 30 [A] (g1 area in FIG. 3).

When the voltage Vd becomes greater than the lower limit voltage Vmin, the voltage generated at the point p3 increases. That is, the voltage generated at the point p3 increases in a linear function manner in accordance with the increase of the voltage Vd (g2 area in FIG. 3). Then, when the voltage Vd reaches to an upper limit voltage Vmax (for example, 20[V]) which is the setting voltage of the zener diode ZD1, the voltage at the point p4 becomes the constant value of the upper limit voltage Vmax. As a result, the voltage at the point p3 becomes a constant value of 16 [V], for example. Since the voltage 16 [V] is made correspond to the threshold current 90 [A], the maximum threshold current becomes 90 [A] (g3 area in FIG. 3).

As described above, the threshold current adjusting portion 21 can adjust the threshold current within a range from 30 to 90 [A] based on the voltage Vd detected by the voltmeter 14. In the case where the voltage Vd becomes equal to or lower than the lower limit voltage Vmin, the erroneous shutoff of the semiconductor switch 11 due to the voltage fluctuation or noise at the normal time can be prevented by setting the threshold current Iref to a constant value. Further, the semiconductor switch 11 at the time of the occurrence of a dead short can be protected by setting the upper limit voltage Vmax to a voltage equal to or lower than the withstanding voltage of the semiconductor switch 11.

Although the explanation is made as to the example where the threshold current adjusting portion 21 has the configuration shown in FIG. 2, the invention is not limited thereto and the threshold current adjusting portion 21 may be configured in a software by using a microcomputer or an IC (Integrated Circuit).

Next, the explanation will be made as to the operation of the load circuit protection device according to the embodiment with reference to a characteristic diagram shown in FIG. 4. In FIG. 4, a curved line S1 is a characteristic diagram showing the change of the current flowing through the semiconductor switch 11, that is, the current detected by the ampere meter 15, a curved line S2 is a characteristic diagram showing the change of the voltage Vd detected by the voltmeter 14, and a curved line S3 is a characteristic diagram showing the change of the threshold current Iref set at the threshold current adjusting portion 21. Further, a curved line S4 is a characteristic diagram showing the change of the threshold current at the time of employing the technique of the prior art.

When an ON signal is input into the control circuit 17 in a state that each of the switches 13a, 13b shown in FIG. 1 is in an off state, the output of the comparator COP1 becomes the High level and so the output of the logical circuit AND1 becomes the High level. The driving circuit 16 turns on the semiconductor switch 11 in response to the High level signal. Then, when the semiconductor switch 11 is turned on at a time point t0 shown in FIG. 4, a current flows into the load 12c. At this time, since a rush current is generated, the detection current I1 (curved line S1) increases abruptly as shown by a symbol q1 in FIG. 4. According to this current increase, since a counter electromotive force is generated at the electric wire between the semiconductor switch 11 and the battery VB due to an inductance component existing in the electric wire, the voltage Vd (curved line S2) reduces. The threshold current Iref (curved line S3) reduces according to this voltage reduction. In this case, since the reduction amount of the threshold current Iref does not become large, the detection current I1 does not exceed the threshold current Iref, whereby the output signal of the comparator COP1 maintains the High level. That is, the on state of the semiconductor switch 11 is maintained. Thereafter, the detection current I1 shown by the curved line S1 reduces to the normal current. According to this current reduction, since the voltage Vd also increases to the normal voltage, the threshold current Iref returns to the normal value.

Thereafter, when a dead short (a failure such as the direct short-circuit between the battery VB and the ground) occurs in the load circuit 1 at a time point t1, the detection current I1 (curved line S1) increases abruptly and further an excessive counter electromotive force is generated according to this current increase. Thus, the voltage Vd (curved line S2) reduces abruptly and also the threshold current Iref (curved line S3) reduces abruptly in the similar manner. As a result, since the detection current I1 exceeds the threshold current Iref at a time point t3, the signal supplied to the negative-side input terminal of the comparator CMP1 exceeds the signal supplied to the positive-side input terminal thereof, whereby the output signal of the comparator CMP1 changes into the Low level.

As a result, since the output signal of the logical circuit AND1 changes into the Low level, the driving circuit 16 turns off the semiconductor switch 11. Thus, when a dead short occurs in the load circuit 1, since the semiconductor switch 11 can be turned off at the time point t3, the semiconductor switch 11 and the various kinds of constituent elements such as the electric wires constituting the load circuit 1 can be protected from the overheating.

Further, when compared with the threshold current represented by the curved line S4 shown as the example of the prior art, the detection current I1 exceeds the threshold current at the time point t4 in the case of the prior art example. However, when the load circuit protection device according to this embodiment is employed, it will be understood that the semiconductor switch 11 can be turned off at an earlier time point at the time of the occurrence of a dead short.

Next, the explanation will be made with reference to a characteristic diagram shown in FIG. 5 as to a case where the switch 13a or 13b is turned on after the semiconductor switch 11 is turned on and a rush current reduces and becomes a normal current. In FIG. 5, a curved line S11 is a characteristic diagram showing the change of the current flowing through the semiconductor switch 11, that is, the current detected by the ampere meter 15, a curved line S12 is a characteristic diagram showing the change of the voltage Vd detected by the voltmeter 14, and a curved line S13 is a characteristic diagram showing the change of the threshold current Iref set at the threshold current adjusting portion 21. Further, a curved line S14 is a characteristic diagram showing the change of the threshold current at the time of employing the technique of the related art.

As shown in FIG. 5, when the switch 13a is turned on at a time point t11 after the semiconductor switch 11 is turned on at a time point t10 and the current reduces to a normal current, a rush current is generated again as shown by a symbol q11 and the detection current I1 (curved line S11) increases. However, like the aforesaid case where the semiconductor switch 11 is turned on, although the threshold current Iref (curved line S13) reduces, the detection current I1 does not exceed the threshold current Iref, whereby the on state of the semiconductor switch 11 is maintained. That is, the erroneous turning-off of the semiconductor switch 11 can be prevented when the switch 13a provided on the downstream side of the semiconductor switch 11 is turned on in the case where the semiconductor switch 11 is placed in the on state.

Comparison will be made as to the threshold current represented by the curved line S14 shown as the example of the related art. In the case of the related art example, the threshold current reduces gradually from the time point t10 where the semiconductor switch 11 is turned on, as shown by the curved line S14, and becomes lower than the detection current I1 at a time point shown by the symbol q11. Thus, the semiconductor switch 11 will be erroneously turned off due to a rush current when the switch 13a provided on the downstream side of the semiconductor switch 11 is turned on. In other words, by employing the protection device according to the embodiment, the erroneous turning-off of the semiconductor switch 11 due to the operation of the switch provided on the downstream side of the semiconductor switch 11 can be surely prevented.

In this manner, in the load circuit protection device according to the embodiment, the voltage Vd generated at the arbitrary point on the electric wire between the battery VB and the semiconductor switch 11 is detected, then the threshold current Iref is adjusted according to the voltage Vd, and the semiconductor switch 11 is turned off when the detection current I1 exceeds the threshold current Iref. When a dead short occurs, since an excessive counter electromotive force is generated, the voltage Vd reduces to a large extent and hence the threshold current Iref also reduces to a large extent. Thus, the semiconductor switch 11 can be turned off at an earlier time point.

Further, although a counter electromotive force is generated due to a rush current immediately after the turning-on of the semiconductor switch 11, since an amount of the reduction of the threshold current Iref is not so large, the detection current I1 does not exceed the threshold current Iref. Thus, the erroneous turning-off of the semiconductor switch 11 due to a rush current can be prevented. Further, the semiconductor switch 11 can be turned off immediately in the case where a dead-short occurs immediately after the turning-on of the semiconductor switch 11.

Further, even in the case where each of the switches 13a, 13b on the downstream side is turned on after the semiconductor switch 11 is turned on and the current becomes stable, since a rush current generated at this time does not exceed the threshold current Iref, the erroneous turning-off of the semiconductor switch 11 can be avoided.

Although the load circuit protection device according to the invention is explained based on the embodiment shown in the figures, the invention is not limited thereto and the configurations of the respective portions may be replaced by arbitrary configurations having similar functions, respectively.

For example, although the embodiment is explained as to the protection device for protecting the load circuit to be mounted on a vehicle, the invention is not limited thereto. Further, although the embodiment is explained as to the case where the three loads 12a to 12c are provided on the downstream side of the semiconductor switch 11, the invention is not limited thereto and the number of the loads may be 1, 2 or 4 or more.

Although the invention is explained in detail with reference to the particular embodiment, it will be apparent for skilled persons that various changes and modifications may be performed without departing from the spirit, range and intension of the invention.

The invention is based on Japanese Patent Application (Japanese Patent Application No. 2008-334807) filed on Dec. 26, 2008, the contents of which are incorporated herein by reference.

INDUSTRIAL APPLICABILITY

The invention is quite useful in order to immediately turn off the semiconductor switch to thereby protect the circuit from the overheat at the time of the occurrence of a dead short in the load circuit.

REFERENCE SIGNS LIST 1 load circuit
11 semiconductor switch
12a to 12c load
13a, 13b switch
14 voltmeter
15 ampere meter
16 driving circuit
17 control circuit
21 threshold current adjusting portion
AND1 logical circuit
CMP1 comparator

The invention claimed is:
1. A load circuit protection device for protecting a load circuit including a DC power supply, a semiconductor switch and a load, comprising:
a current detection section that detects a current flowing into the semiconductor switch;
a voltage detection section that detects a voltage generated at an electric wire coupling between the DC power supply and the semiconductor switch;
a threshold current adjusting section that adjusts a threshold current for determining whether or not an overcurrent flows into the load circuit according to the voltage detected by the voltage detection section;
a turning-off control section that determines whether or not a current detected by the current detection section reaches the threshold current and outputs a turning-off signal when it is determined that the detected current reaches the threshold current; and
a driving control section that switches an on/off state of the semiconductor switch based on an external input signal and turns off the semiconductor switch when the turning-off signal is supplied thereto,
wherein the threshold current adjusting section reduces the threshold current according to reduction of a voltage detected by the voltage detection section when the voltage detected by the voltage detection section is reduced and sets an upper limit voltage and a lower limit voltage as to a voltage detected by the voltage detection section, and the threshold current adjusting section adjusts the threshold current in a linear function manner in a voltage region between the lower limit voltage and the upper limit voltage and maintains the threshold current to a constant value in a voltage region equal to or lower than the lower limit voltage and in a voltage region equal to or greater than the upper limit voltage.

2. The load circuit protection device according to claim 1, wherein the output of the turning-off control section is compared with the external input signal.

3. The load circuit protection device according to claim 1, wherein the turning-off control section is a comparator, wherein the threshold current is supplied to the positive-side input terminal and the current detected by the current detection section is supplied to the negative-side input terminal.

4. The load circuit protection device according to claim 1, wherein the voltage detection section is a voltmeter.

* * * * *